(No Model.)
H. VELLENOWETH.
FILTER AND CONNECTION WITH FAUCET OR WATER SUPPLY.
No. 524,007. Patented Aug. 7, 1894.
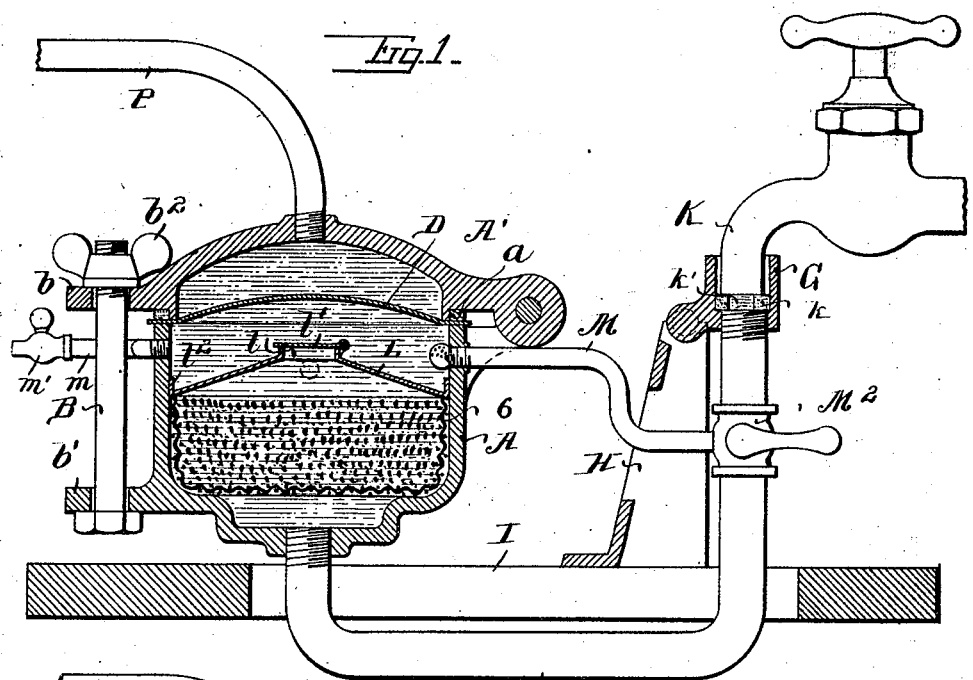
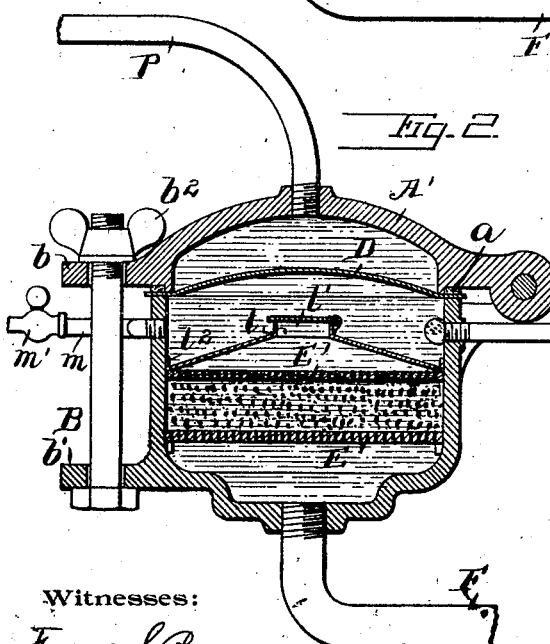
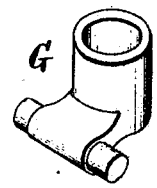
Witnesses:
Inventor.
Harry Vellenoweth
G. T. Harding
Attorney.

UNITED STATES PATENT OFFICE.

HARRY VELLENOWETH, OF PHILADELPHIA, PENNSYLVANIA.

FILTER AND CONNECTION WITH FAUCETS OR WATER-SUPPLY.

SPECIFICATION forming part of Letters Patent No. 524,007, dated August 7, 1894.

Application filed March 1, 1894. Serial No. 501,932. (No model.)

*To all whom it may concern:*

Be it known that I, HARRY VELLENOWETH, a citizen of the United States, residing at Philadelphia, county of Philadelphia, and State of Pennsylvania, have invented a new and useful Improvement in Filters and Connections with Faucets or Water-Supply, of which the following is a full, clear, and exact description, reference being had to the accompanying drawings, which form a part of this specification.

My invention relates to certain improvements in the construction of filters, whereby their efficiency in straining or clarifying liquids, especially water, is highly increased, and further in certain construction whereby the filter apparatus may be connected with the liquid supply pipe without coupling thereto.

I will first describe my improvement as illustrated in the drawings and then particularly point out my invention in the claims.

In the drawings—Figure 1 is an elevation partially in section of my improved filtering apparatus, the liquid supply pipe and the connecting means between said filtering apparatus and liquid supply pipe. Fig. 2 is a sectional view of slightly modified filtering apparatus. Fig. 3 is a perspective view of connecting cap between pipe of filtering apparatus and liquid supply pipe.

The filter proper is formed of an outer case A, preferably metallic, a hinged cover A'; $a$ being a packing ring interposed between the cover A' and case A to make a liquid-tight joint, the cover and case being held tightly together by the bolt B, which passes through projections, $b$ and $b'$, from the cover and case respectively, the nut $b^2$, working in the threaded end of bolt B, enabling the operator to force the case and cover into close contact. In the interior of the case, as shown in Fig. 1, is a basket 6 of proper mesh to allow the liquid to pass readily through it, but to prevent the material contained therein from passing out. In this basket I place ashes, preferably white ash, and above the basket, held in position by resting between the case and the cover at their juncture, is a canvas D or cover of similar material. The bottom of the basket is slightly above the bottom of the case A.

In Fig. 2 is shown a construction wherein, in place of the basket, perforated screens E, E', are used, and the ashes placed between said screens—otherwise the construction is similar to that of Fig. 1.

Between the ashes and the canvas D is a solid plate L made in the form of a frustum of a cone, and having the opening $l$ covered by the hinged cover $l'$. The bottom of this plate L rests on the perforated plate on top of the ashes and the outer edge is bent as shown at $l^2$, so as to project beyond the said ash plate and reach the wall of the case.

F is a pipe which opens into the interior of the case, said pipe being threaded and secured in a threaded orifice in the bottom of the case. This pipe F at its other end is threaded and secured in the threaded portion of cap G. This cap is of a size sufficient to receive all ordinary liquid supply pipes and is supported by means of the projection of circular cross section resting in bearings on a bracket H, fixedly secured, as shown, which is secured to the beam I, through orifices in which the pipe F passes. The pipe is secured to the lower portion of the cap, and the bracket H supports the filtering apparatus, pipe F and cap G, so that the cap can rock in the bearing.

K is the liquid supply pipe which enters the upper end of said cap G, and $k$ is a packing ring having a central orifice $k'$.

Instead of ashes any material fine enough to go through the mesh of the basket or perforated screens, but will not pass through the mesh of the fabric, may be used.

When the filtering apparatus and the cap with its support are in the desired position and the liquid supply pipe is close to the pipe F, the weight of the case A and cover A' will cause the cap G to rock forcing that end of pipe F upward and forcing the packing ring $k$ against pipe K, making a tight joint without the necessity of coupling pipes F and K together.

M is a pipe extending from the pipe F to and into the case A at a point above the plate L, and $m$ is a discharge pipe from the interior of case A provided with a suitable cock $m'$.

$M^2$ is a cock controlling the passage of liquid to pipe M, and adapted either to cause the liquid to pass through from pipe F directly to the bottom of the filter, or to pass through pipe M. In operating, the controlling cock M² is adjusted to cause the liquid to pass through the ashes or other finely divided material in the case A, where it loses its solid matter and becomes partially clarified and forces the finely divided material through the orifice in plate L, lifting the cover l², and against the canvas, the powder clogging and closing the interstices of the fabric, forming a filtering surface through which only pure or practically pure water can pass through the canvas where any solid matter in suspension is removed. The pipe P passes from the top of the cover to carry off the clarified liquid. By this means the incoming liquid itself forces the powder in the basket against the fabric, forming a filtering surface.

Whenever it is necessary to clean the canvas the cock M² is operated to close the flow of liquid to the bottom of case A and cause it to pass through pipe M, which at its end may have a nozzle; and this playing upon the canvas washes off any solid matter which falls on the top of the plate, L, which plate prevents it going farther downward, and, being inclined toward the outer surface of the case, leads it to the periphery where it is carried off by the previously opened pipe m. When it is necessary to remove the canvas or ashes, the cover A' may be removed from the case and any necessary operation performed.

Having now fully described my invention, what I claim, and desire to protect by Letters Patent, is—

1. A filtering apparatus provided with a case, finely divided material within said case, a perforated plate above said material, the mesh of said plate being such as to allow the material to be forced through said plate, and a woven fabric screen above said material, and connection from the source of liquid supply to the interior of said case below said finely divided material.

2. In combination with a filtering apparatus, a pipe leading from said filtering apparatus, a cap secured to said pipe, said cap being supported so as to be adapted to rock, said support forming the support for the filtering apparatus and pipe, a liquid supply pipe adapted to enter said cap in proximity to the first mentioned pipe, and a packing ring having an orifice interposed between said pipes, substantially as and for the purpose described.

3. In combination with a cap supported so as to be adapted to rock, a pipe secured in said cap, a second pipe adapted to enter said cap and rest adjacent to the first mentioned pipe, a packing ring provided with an orifice interposed between said pipes, and means to rock said cap to force the pipe to which it is attached against the other pipe, substantially as and for the purpose described.

4. A filtering apparatus provided with a case, finely divided material in said case, a woven fabric above said material, a conical plate between said finely divided material and fabric, and connection from the source of liquid supply to the interior of said case between said plate and the fabric, and an outlet from said case between said plate and fabric.

5. A filtering apparatus provided with a case, finely divided material in said case, a woven fabric above said material, a conical plate between said finely divided material and fabric and connection from the source of liquid supply to the case below said finely divided material and between said plate and fabric, and means to cause said liquid to flow to either of said points, and an outlet from said case between said plate and fabric.

In testimony of which invention I have hereunto set my hand.

HARRY VELLENOWETH.

Witnesses:
FRANK S. BUSSER,
PHILIP BOUTELJE.